Sept. 4, 1962   J. L. RIDDELL ETAL   3,052,546
CONCENTRATED DE-ALCOHOLIZED WINE PRODUCT
Filed June 16, 1961
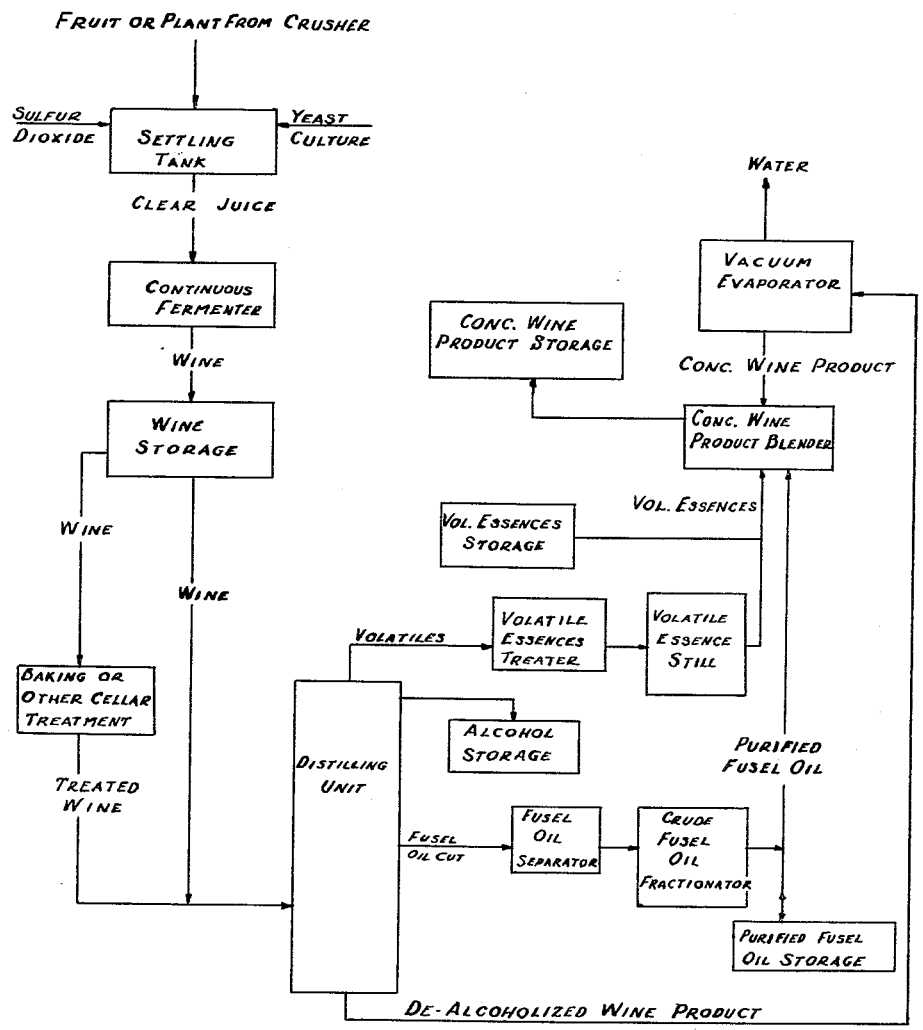
FLOW SHEET FOR THE PRODUCTION OF DE-ALCOHOLIZED CONCENTRATED WINE PRODUCT
INVENTORS.
JAMES L. RIDDELL
BY MASSUD S. NURY
ATTORNEYS

3,052,546
CONCENTRATED DE-ALCOHOLIZED WINE PRODUCT

James L. Riddell and Massud S. Nury, Fresno, Calif., assignors to Vie-Del Grape Products Company, a corporation of Nevada
Filed June 16, 1961, Ser. No. 120,132
5 Claims. (Cl. 99—40)

This invention relates in general to the manufacture of a concentrated de-alcoholized fruit or plant wine produced by a process involving the making of a natural, specially prepared wine and removing water from this natural, specially prepared wine to produce a concentrated wine product. The product may contain some water and may represent between 10 and 20 percent, by volume, of the original natural wine or in the alternative, may be further concentrated from the 10–20 percent level to constitute an entirely dehydrated and de-alcoholized wine product.

In a de-alcoholized and partially dehydrated wine product which is to be used as a food or beverage flavoring, a pronounced characteristics bouquet, aroma and taste is of prime importance. To make such a product, it is imperative that a wine be produced containing a miximum of desirable congenerics and that these be retained in the final product. By "congenerics" is means the many largely unknown susbtances, some of which may be present in a wine in only trace quantities, and which may be detected and evaluated mainly by sensory examination, i.e., odor and tase. It has been found that the fermentation process generally used in the industry, i.e., batch fermentation in open fermenting vessels, produces a wine lacking in some congenerics desirable in a concentrated product.

It is therefore an object of this invention to provide a process for the manufacture of a specially prepared wine which, when de-alcoholized and partially dehydrated, constitutes a product which may be used as a non-alcoholic food flavoring or may be added to natural wines to accentuate their flavor.

It is a further object of this invention to provide a process for the manufacture of a de-alcoholized and partially dehydrated wine product which may be used as a non-alcoholic food flavoring or may be added to natural wines to accentuate the flavor thereof.

Other objects and advantages of this invention, if not specifically set forth, will become apparent during the course of the description which follows.

Generally, this process comprises the continuous fermentation of must in a substantially closed system followed by distilling off the alcohol to yield a product which is thereafter evaporated to remove a large percentage of the water therefrom.

As indicated, the first step of the process is the continuous fermentation of must in a relatively closed system, the carbon dioxide which forms being removed as the fermentation continues. In the flow sheet, yeast inoculation is made in the settling tank where fermentation will start and usually a small amount of sugar ends fermentation in storage tank. There are various advantages flowing from the selection of continuous fermenation rather than batch fermentation. Fermentation time is greatly reduced which, in turn, reduces the formation of undesirable flavor constituents formed by the extended action of acetobacilli, lactobacilli and other organisms naturally present in the wine and encourages the formation of clean and pleasant flavors considered more necessary in the instant product. Further, closed system continuous fermentation eliminates outside contamination, prevents loss to the air of volatile desirable flavor constituents and prevents destruction of flavor constituents by oxidation.

The wine prepared in the above manner may be used as feed for the next step in the proces. However, optionally, the wine may first be modified by baking or other accepted cellar methods, to provide the flavors desired.

The second step in this invention consists of passing the wine prepared above through a distilling unit, which may be of the continuous or batch type and which operates at an absolute pressure within the range 48 to 192 mm. Hg. Such distillation units are generally of conventional construction and operation, but certain requirements must be observed. All surfaces in contact with the wine, or separated components thereof, must be constructed of stainless steel or similar material which is inert to the wine fluids at the processing temperatures. This is necessary to prevent catalytic destruction of flavor components by iron, copper or other reactive metals or alloys. Heat to the stills must be supplied by closed heating coils and not by injection of live steam into the wine fluids. Volatile materials preceding alcohol during distillation are led into an ester-aldehyde enricher and the enriched product is treated for the removal of undesirable flavor components, for example by neutralizing the material with sodium hydroxide and distillation. The volatile essences thus obtained may be used separately as natural flavors or may be incorporated into the final concentrated wine product. Less volatile materials following the alcohol during distillation are withdrawn from the distilling unit as fusel oils in a conventional manner and separated from alcohol and water in a conventional fusel oil decanter. The crude oils may be refined by fractional distillation and the desirable flavor components such as higher alcohols and esters either may be used separately or added to the final concentrated wine prouct.

Conveniently, a conventional rectifying column is used wherein a series of plates are provided having bubble caps or equivalent means for allowing passage therethrough of vapors and having overflow pipes for the downward passage of liquids. The liquid enters at a midpoint and passes downwardly from the feed plate, overflowing from plate to plate. The various volatile essences are driven off ahead of the alcohol and these are trapped in the fashion indicated above. Thereafter, they may be suitably treated and returned to the de-alcoholized concentrate or used separately. The alcohol is stripped from the wine in the lower portion of the column and substantially pure alcohol forms in the enriching section, then to be wtihdrawn at a point near the top thereof. A cut containing the higher alcohols (fusel oils) is removed at a point intermediate the point of entry of the fermented wine product, and the point of removal of the ethanol.

The third step of this invention consists of moving the de-alcoholized wine materials from the bottom of the distilling unit into a vacuum evaporator, also constructed of a material inert to de-alcoholized wine, such as stainless steel. The de-alcoholized wine is heated therein to between 100° and 150° F., at an absolute pressure of between about 48 and about 192 mm. Hg in order to remove between 75% and 90% of the total water content of the de-alcoholized wine. In this manner, a product is formed which represents, by volume, between 10% and 20% of the original natural wine.

It is noted that both the distillation unit and the evaporator require a vacuum; this makes possible operations at less than 150° F. below which the undesirable destruction of flavor components, as described above, may be lessened.

The product so formed in the vacuum evaporator may be blended with purified volatile and less volatile essences recovered in the distilling unit to provide a concentrated de-alcoholized product containing essentially all the desirable flavors obtainable from a natural wine.

This product may be used as a food or beverage flavoring or it may be added to whole wine to yield a highly flavored natural wine product. It is also suitable for use in tonics and other medicinal preparations where the presence of wine minerals, esters and other congenerics is considered beneficial and/or where the presence of alcohol and water is non-essential or undesirable.

The attached flow sheet shows the fruit or plant from the crusher entering the "settling tank" where about 80 p.p.m. of sulfur dioxide and a 5% by volume actively growing yeast solution is added. The clear juice is continuously fed into the "continuous fermenter" and fermented juice or wine is continuously withdrawn to "wine storage." This wine may go directly to the "distilling unit" or may first be subjected to "baking or other cellar treatment" and then go to the "distilling unit." From the "distilling unit" volatile materials go to the "volatile essence treater," then to the "volatile essence still." See Example 3 below for details with respect to the operation of the volatile essence treater and the volatile essence still. The recovered essences may either go to the "volatile essence storage" or directly to the "concentrated wine product blender." The recovered alcohol from the "distilling unit" is taken to storage. The fusel oil cut from the "distilling unit" is taken to the "fusel oil separator" and the crude fusel oil to a "crude fusel oil fractionator." The operation of these last two units may be better understood from Example 4 below. The purified fusel oil is taken either to "purified fusel oil storage" or directly to the "concentrated wine product blender." The de-alcoholized wine product from the "distilling unit" is taken to the "vacuum evaporator" and the concentrated wine product goes to the "concentrated wine product blender," which represents the main final product described in this invention.

Examples are set forth below for illustrative purposes but these are not to be interpreted as imposing limitations on the scope of the invention other than as set forth in the appended claims.

*Example 1*

To a grape juice a 5% actively growing yeast was added and after a settling period of 12–24 hours the free run juice was withdrawn and fed into rapidly fermenting wine in a continuous fermenter at the rate of 5% per hour of the fermenter capacity. Wine was continuously removed from the continuous fermenter and allowed to finish the residual fermentation process in a closed tank. The finished wine, containing 11% by volume of alcohol, was pumped into a continuous distilling unit, operated at a pressure of 192 mm. Hg absolute to give a maximum bottom temperature of 150° F. From the distilling column the following products were removed continuously:

(a) 1% (by volume of wine) of volatile materials from top of unit;
(b) 10.5% (by volume of wine) of 189° proof alcohol from near top of the unit;
(c) 1% (by volume of the wine) from near middle of unit;
(d) 87.5% (by volume of wine) from bottom of unit.

The de-alcoholized wine removed from the bottom of the distilling unit was pumped into a vacuum evaporator which operated at a temperature of 150° F. and an absolute pressure of 192 mm. Hg. Water was removed until a wine residue, equal in volume to 11% of the original wine, was continuously withdrawn. This residual dealcoholized and concentrated wine product contains most of the flavor components of the original wine, but in a concentrated form, and is considered a useful and unique natural product.

*Example 2*

Wine from the continuous fermenter (see Example 1) was baked in a conventional sherry cooker for 3 months at a temperature of 130° F. and then subjected to distillation and concentration as in Example 1. The de-alcoholized, concentrated product of a pronounced sherry character is useful as a concentrated sherry-type flavoring.

*Example 3*

100 ml. of the volatile materials, recovered from the top of the distilling unit in Example 1, were treated with 10 ml. of 6 normal sodium hydroxide. After addition of 90 ml. of water to the neutralized volatile materials, the solution was distilled in the laboratory. The first 100 ml. of the distillate were discarded, but the second 60 ml., containing desirable volatile essences, were recovered and blended with 1 liter of the dealcoholized and concentrated wine product recovered as the final product in Example 1.

*Example 4*

The product removed in Example 1 from near the middle of the distilling unit containing alcohol, water and crude fusel oils was treated in a conventional fusel oil decanter and the separate oily fusel oil layer removed. 100 ml. of this crude fusel oil was fractionated in a laboratory packed column. The first 40 ml. of the distillate were retained and the remainder discarded. One ml. of this recovered and highly flavored essence was added to 1 liter of the de-alcoholized and concentrated wine product which was recovered as the final product in Example 1.

The concentrated wine product, produced as outlined in Examples 1 or 2 above, may be concentrated further, to a volume less than 10% of the original wine, by the same process described above. However, as the volume of residual wine is decreased, supersaturation of the dissolved wine solids occurs and undue amounts of these solids precipitated out. It is therefore better, if concentration beyond 10–12 fold is desired, to dehydrate the wine to a solid, essentially water-free material, by any one of several accepted dehydration procedures such as: spray drying, foam drying or freeze drying. All these processes have been amply described in the technical literature.

The wine thus dehydrated may be vacuum packed as such. Or to the dehydrated wine product one may, immediately after drying, add essences, as obtained and refined by the described process, to produce a highly flavored dehydrated wine product representing by weight from 1.5%–5% of the original wine. This dehydrated product is useful as a flavoring material since it contains, in a highly concentrated form, most of the minerals and flavoring ingredients of the original wine.

The example set forth below shows the aforementioned further dehydration to yield a solid, essentially water-free material.

*Example 5*

100 ml. of concentrated sherry wine, produced as in Example 2 and representing 10% by volume of the original sherry wine, was dried at a pressure of about 49 mm. Hg absolute, at a temperature of 120° F., to produce 20 grams of a dehydrated product of pronounced sherry character and useful as a sherry flavoring. To a portion of this dehydrated product essences as obtained in Examples 3 and 4 were added and mixed immediately after dehydration to yield a highly flavored dehydrated sherry wine. It is desirable that the essences be added to the dry solids immediately after dehydration. The essences are aqueous and oily materials and are promptly absorbed by the normally hygroscopic solid materials produced as explained in Example 5. If the essences are not added immediately, vacuum packing promptly after dehydration is recommended since otherwise the hygroscopic solids will tend to absorb a significant amount of moisture from the air.

Throughout the foregoing descriptions, it has been pointed out that a maximum temperature of 150° F. is tolerable under the proper pressure conditions. It is even possible to operate as high as 160° F. and at a correspondingly higher absolute pressure, with results which are not entirely unsatisfactory. However, as the temperature and pressure increase there is a gradual increase in heat damage which not only causes gradual destruction of flavors but also formation of decomposition products which are undesirable and tend to lower the quality of the product. Hence, a maximum temperature of 150° F. may be stipulated as the level beyond which it is undesirable to go in commercial operation and it is in fact desired that substantially lower temperatures be used since the lowest of the temperatures specified enable products of the best possible quality.

Obviously, many modifications and variations may be made without departing from the spirit and scope of this invention and therefore only such limitations should be imposed as are indicated in the appended claims.

This is continuation-in-part of application Serial No. 843,216, filed September 29, 1959.

We claim:

1. A process for preparing a wine concentrate containing no alcohol and lesser quantities of water than natural wine comprising: preparing a fermented wine product by fermenting juice in a closed fermentation zone while removing the carbon dioxide so formed; passing said wine into a distillation zone, the surfaces of said zone contacting the said wine being entirely constructed of a material inert to said wine at 150° F.; maintaining the said wine within the said zone at a temperature of between about 100° F. and 150° F. and under a pressure of about 48–192 mm. Hg aboslute and for a time sufficient to cause the volatilization of alcohol therefrom without substantial volatilization of water; removing the concentrated volatilized alcohol therefrom; removing a substantially alcohol-free component from the said zone and passing the de-alcoholized component into a vacuum evaporation zone having internal surfaces which are inert with respect to the said de-alcoholized component at temperatures of about 150° F. and below; heating the said de-alcoholized component therein to a temperature of between 100° F. and 150° F. under a pressure of about 48–192 mm. Hg absolute to cause the volatilization of water therefrom; and retaining said component therein until sufficient water is removed therefrom to yield a de-alcoholized and partially dehydrated product representing between about 10 and 20 percent of the volume of the original natural wine product.

2. The process of claim 1 wherein distillation in the distillation zone is carried out at a temperature of about 150° F. and at a pressure of about 192 mm. Hg absolute and wherein the evaporation in the vacuum evaporation zone is carried out at a temperature of about 150° F. and a vacuum of about 192 mm. Hg absolute.

3. The process of claim 1 wherein materials more volatile than alcohol are separately removed from the distillation zone, are neutralized with NaOH and are distilled to yield a volatile essence which is thereafter blended with the said product obtained from the vacuum evaporator representing between about 10 and 20 percent of the volume of the original natural wine product.

4. The process of claim 1 wherein crude fusel oils are removed from the distillation zone and separated from any additional materials in admixture therewith and said fusel oils are fractionated to yield a cut containing highly flavored essences, which cut is thereafter added to the said de-alcoholized and partially dehydrated product representing between about 10 and 20 percent of the volume of the original natural wine product.

5. A process for preparing a dehydrated and de-alcoholized solid wine concentrate comprising: preparing a fermented wine product by fermenting juice in a closed fermentation vessel while removing the carbon dioxide so formed; passing said wine into a distillation unit, the surfaces of said unit contacting the said wine being entirely constructed of a material inert to said wine at 150° F.; maintaining the said wine within the said unit at a temperature of between about 100° F. and 150° F. and under a pressure of about 48–192 mm. Hg absolute and for a time sufficient to cause the volatilization of alcohol therefrom without substantial volatilization of water; removing the concentrated volatilized alcohol therefrom; removing a substantially alcohol-free component from the said unit and passing the de-alcoholized component into a vacuum evaporator having internal surfaces which are inert with respect to the said de-alcoholized component at temperatures of about 150° F. and below; heating the said de-alcoholized component therein to a temperature of between 100° F. and 150° F. under pressure of about 48–192 mm. Hg absolute to cause the volatilization of water therefrom; and retaining said component therein until sufficient water is removed therefrom to yield a de-alcoholized and partially dehydrated product representing between about 10 and 20 percent of the volume of the original natural wine product; and further drying said product so formed whereby to yield a substantially completely dehydrated and de-alcoholized material.

References Cited in the file of this patent

UNITED STATES PATENTS

| | | |
|---|---|---|
| 1,264,564 | Russell | Apr. 30, 1918 |
| 2,104,244 | Ring | Jan. 4, 1938 |
| 2,118,834 | Boecheler | May 31, 1938 |
| 2,157,632 | Schapiro | May 9, 1939 |

OTHER REFERENCES

Cruess: "Principles and Practice of Wine Making," 1947, 2nd Edition, Avi Publishing Co., Inc., N.Y., pages 212, 213.